Oct. 17, 1944. W. C. POPE 2,360,363
CABLE SLITTING MACHINE
Filed June 11, 1943

INVENTOR.
William C. Pope
BY Fred B. Matheny
ATTORNEY.

Patented Oct. 17, 1944

2,360,363

UNITED STATES PATENT OFFICE 2,360,363

CABLE SLITTING MACHINE

William C. Pope, Seattle, Wash.

Application June 11, 1943, Serial No. 490,537

9 Claims. (Cl. 164—39)

This invention relates to a cable slitting machine and the object of this invention is to provide a simple and efficient machine for slitting the protective covering of an electric cable to facilitate salvaging the materials contained in said cable.

Cables of the type used in communication and transmission of electric current usually comprise a plurality of metal wires disposed within a protective covering of insulating material such as lead or a composition of rubber and fabric or asbestos.

The covering used on large cables of this type is relatively thick and is tough and hard to cut in salvaging the cables.

There is a substantial amount of this cable ranging in diameter from one to five inches to be salvaged. A portion of this is used or old cable and a portion of it is made up of short lengths of new cable which have been scrapped because they are too short to use.

It is an object of this invention to provide a simple and efficient machine for longitudinally slitting cable of this nature to facilitate the salvaging of the wires within the cable and the rubber or other material in the protective covering of said cable.

It is another object of this invention to provide a cable slitting machine having a driven pulley provided with a peripheral groove of V shaped cross section that is adapted to receive and grip cable of different diameter and to move said cable past a slitting knife by which the protective covering of the cable is longitudinally cut or laid open.

Other objects of the invention will be apparent from the following description and accompanying drawing.

In the drawing Fig. 1 is a view partly in elevation and partly in vertical section taken substantially on broken line 1—1 of Fig. 2, and showing a cable slitting machine constructed in accordance with my invention.

Like reference numerals designate like parts throughout the several views of the drawing.

Figure 1:
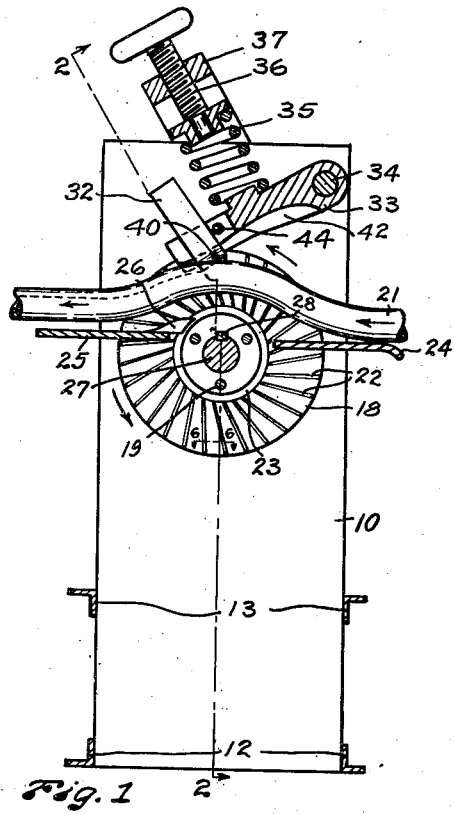

Figs. 1 to 6 show a cable slitting machine constructed in accordance with this invention. The frame of this machine preferably comprises two spaced apart upright frame members 10 and 11 having transverse lower frame bars 12 and upper frame bars 13 secured thereto. The frame bars 12 and 13 extend a substantial distance to one side of the upright frame 10—11. The lower frame bars 12 are adapted to rest on the floor and form a stable support for the upright frame 10—11. Preferably truss members 14 are provided between the lower frame bars 12 and upper frame bars 13. A plate 15 is rigidly secured to the upper frame bars 13 to form a support for a combined motor and speed reduction gear 16.

The upper end portions of the frame members 10—11 support the cable slitting mechanism. This mechanism comprises a grooved cable feeding sheave or pulley, preferably formed of two parts 17 and 18 of frustro conical shape. The two parts 17 and 18 are coaxially positioned with their smaller end portions in abutting relation and are rigidly secured together by any suitable means, such as screws 19. These parts 17 and 18 thus cooperate to form a sheave having a V shaped circumferential groove 20 adapted to receive a cable 21.

The conical surfaces of the pulley parts 17 and 18 are provided with teeth 22 for engagement with the cable 21. The teeth 22 minimize slippage between the pulley and the cable and thus help to provide a more positive cable driving means. The teeth 22 are preferably inclined as respects radial lines of the pulley or are given a lead, as shown in Fig. 1, so that when the pulley is driven in the direction shown by the arrows in Fig. 1 the lead of the teeth 22 will tend to draw the cable toward the center of the pulley. Preferably the teeth 22 are of the cross sectional shape shown in Fig. 4.

Figure 2:
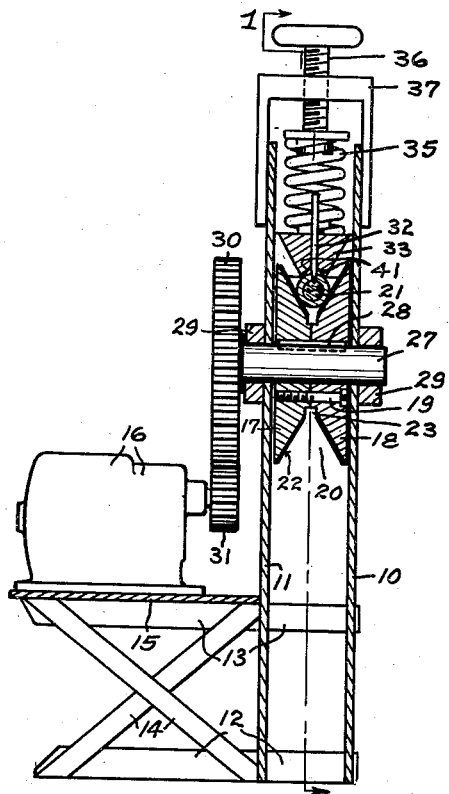
Fig. 2 is a view partly in section and partly in elevation of the same taken substantially on broken line 2—2 of Fig. 1.

Preferably a small annular groove 23, see Fig. 2, with parallel side walls is provided at the bottom of the V shaped groove 20.

A cable supporting plate 24 is rigidly secured to the frame 10—11 and extends into the V shaped groove 20 at the cable infeed side of the pulley 17—18.

A stripper plate 25 is rigidly secured to the frame 10—11 and extends into the V shaped groove 20 at the cable outfeed or discharge side of the pulley 17—18. A tooth member 26 carried by the inner end portion of the stripper plate 25 extends into the small groove 23 at the bottom of the V shaped groove 20.

The plate 24 serves as a support and guide for the cable and facilitates feeding the cable into the machine. The stripper plate 25 and tooth 26 prevent the cable or any parts of said cable from winding around the pulley 17—18 and insure that the cable and all parts thereof will discharge properly from the machine after the slitting operation The pulley 17—18 is fixedly secured to a shaft 27, as by a key 28. The shaft 27 extends crosswise of the frame members 10—11 and is journaled in bearings 29. A gearwheel 30 on the shaft 27 meshes with a gear pinion 31 of the combined motor and speed reduction gear 16 to provide driving means for the pulley 17—18.

A cable slitting knife 32, Figs. 1 and 2 is carried by a knife holding member 33 that is mounted on pivot means 34. A compression spring 35 engages the top side of the knife holding member 33 and is adapted to exert a downward pressure on the same. The upper end portion of the spring 35 is adjustably supported by manually operable screw means 36 that is in threaded engagement with a bracket or stirrup 37 of inverted U shape. The bracket 37 is rigid with the frame 10—11.

Figure 3:
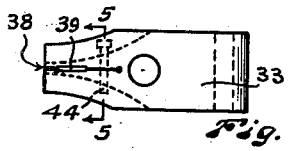
Fig. 3 is a detached top plan view of a knife holding member with the knife omitted.
Figure 6:
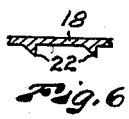
Fig. 6 is a fragmentary enlarged sectional view taken on broken line 6—6 of Fig. 1 and showing the cross sectional shape of the teeth on a cable gripping pulley.
Figure 4:
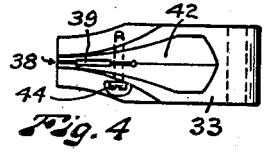
Fig. 4 is a bottom plan view of said knife holding member.
Figure 5:
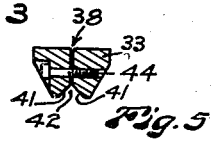
Fig. 5 is a sectional view of said knife holding member taken substantially on broken line 5—5 of Fig. 3.

Preferably the movable end portion of the knife holding arm 33, i. e. the portion shown at the left in Figs. 1 and 3, has a slot 38, provided with a wider portion 39, Fig. 3, to receive and properly position the cable slitting knife 32. Also preferably means, such as a screw or bolt 44, is provided in the arm 33 to clamp the knife 32.

The inner end of the knife 32 is at right angles to the length of the knife and is sharpened, preferably by grinding the same on both sides, to form a cutting edge 40 that extends crosswise of the knife. Preferably the knife is positioned at an angle, substantially as shown in Fig. 1, relative to the cable 21 that is to be slitted.

The outer sides of the knife carrying end portion of the member 33 are tapered, as shown in Figs. 2 to 5, so that this portion of said member 33 can operate between the disc or pulley members 17—18 without contacting said members 17—18. The bottom side of the member 33 has a V shaped slot 42 extending longitudinally thereof and the knife 32 protrudes from the vertex of this slot 42. The portions 41 at the two sides of the V shaped slot 42 near the knife 32 are adapted to engage with the cable 21 to limit the depth of cut of the knife and hold the cable down in the pulley 17—18. The V shaped slot 42 extends to a point near the pivoted end portion of the member 33 and is of substantial depth to help in guiding the forward end portions of cable into the machine.

Figure 7:
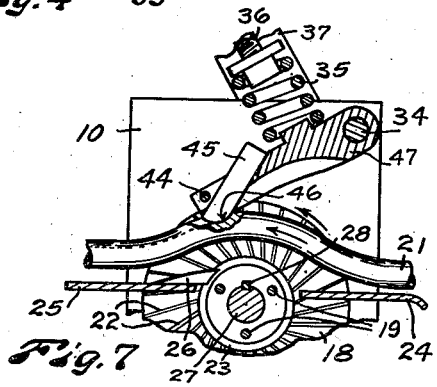
Fig. 7 is a fragmentary view partly in section and partly in elevation showing a modified form of cable slitting knife.

Fig. 7 shows a cable slitting knife 45 of modified form. This knife 45 has a rounded and sharpened cable slitting edge 46. A knife holding arm 47 somewhat similar to arm 33 carries knife 45. The other parts in Fig. 7 are similar to those shown in Figs. 1-5.

Figure 8:
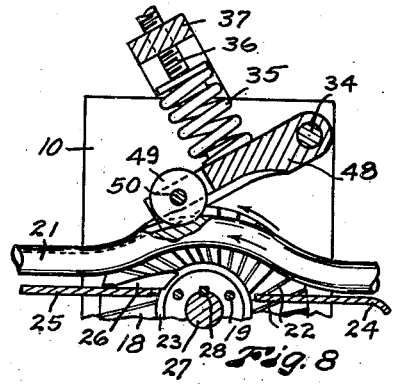
Fig. 8 is another fragmentary view partly in section and partly in elevation showing a cable slitting device in the form of a rotatively mounted disc shaped knife.

Fig. 8 shows a knife holding arm 48 somewhat similar to the arm 33 but having a disc shaped knife or rolling cutter 49 rotatively mounted therein on a bearing means 50. This rolling cutter 49 operates with minimum friction. Other parts in Fig. 8 are similar to those shown in Figs. 1-5 and are similarly numbered.

In the operation of applicant's device the pulley 17—18 is driven in the direction indicated by the arrows in Figs. 1, 7 and 8, preferably fast enough to move the cable 21 at a speed of from seventy-five to one hundred twenty-five feet per minute. The cable 21 to be salvaged usually comprises a core portion formed of metal wires and a protective covering, usually of rubber and fabric or cord but which may be of lead or of various other protective materials.

The knife 32 or 45 or 49 is positioned for the proper depth of cut. The end portion of the cable to be salvaged is then fed into the roller 17—18 from right to left as respects the showing in Fig. 1. The roller 17—18 will firmly grip the cable and move the same under and past the knife, and the protective covering or armor on the outside of the cable will be slitted throughout the entire length of the cable. This makes it easy to remove the protective covering from the core portion of the cable and facilitates the salvaging of both of these parts.

Obviously pieces of cable of any desired length and of wide variation in diameter may be slitted in this machine without requiring any adjustment of the machine. For instance, pieces of cable of mixed diameters varying from one to five inches may be fed at random through one of these machines and each piece slitted from end to end without varying the adjustment of the machine.

Usually the protective coverings of cables of different diameters, within the range of this machine, will not vary enough in thickness to require adjustment of the knife as it is not objectionable if the knife enters the core of the cables of smaller diameter.

The foregoing description and accompanying drawing clearly disclose a preferred embodiment of this invention but it will be understood that this disclosure is merely illustrative and that changes in the invention may be made within the scope and spirit of the following claims.

I claim:

1. In a machine for longitudinally slitting a cable to facilitate salvaging the same, a rotatively mounted driven pulley having a V shaped groove extending around its periphery; a swingingly mounted knife holding arm pivotally supported adjacent one end; and a knife carried by the other end portion of said knife holding arm and having a cutting portion extending toward the groove of said pulley for cutting engagement with a cable in said groove.

2. In a machine for longitudinally slitting a cable to facilitate salvaging same, a rotatively mounted driven pulley having a V shaped groove extending around its periphery; a knife having a cutting portion extending toward the groove of said pulley for cutting engagement with a cable in said groove; and a stripper plate extending into said groove at a point beyond the knife.

3. In a machine for longitudinally slitting a cable to facilitate salvaging the same, a frame; a pulley rotatively mounted on said frame and having a V shaped groove extending around its periphery adapted to receive a cable to be slitted; pulley driving means connected with said pulley; a swingingly mounted knife holding arm having one end portion pivotally connected with said frame; and a cable slitting knife carried by the other end portion of said knife holding arm and having a cutting portion extending toward said pulley and positioned to engage with a cable in said groove.

4. In a machine for longitudinally slitting a cable to facilitate salvaging the same, a frame; a pulley rotatively mounted on said frame and having a V shaped groove extending around its periphery adapted to receive a cable to be slitted; pulley driving means connected with said pulley; a swingingly mounted knife holding arm having one end portion pivotally connected with said frame; a cable slitting knife carried by the other end portion of said knife holding arm and having a cutting portion extending toward said pulley and positioned to engage with a cable in said groove; and yielding means urging said knife into cutting engagement with a cable.

5. In a machine for longitudinally slitting a cable to facilitate salvaging the same, an upright frame comprising two spaced apart side members; a pulley rotatively mounted between said two spaced apart side members; a V shaped groove extending around the peripheral portion of said pulley adapted to receive a cable to be slitted; teeth in the walls that form the sides of said V shaped groove to engage with and grip a cable; pulley driving means connected with said pulley; and a cable slitting knife having a cutting portion extending toward said pulley into the path of a cable disposed in the groove of said pulley.

6. In a machine for longitudinally slitting a cable to facilitate salvaging the same, an upright frame comprising two spaced apart side members; a pulley rotatively mounted between said two spaced apart side members; a V shaped groove extending around the peripheral portion of said pulley adapted to receive a cable to be slitted; teeth in the walls that form the sides of said V shaped groove to engage with and grip a cable; pulley driving means connected with said pulley; a knife holder pivotally mounted between said two upright frame members and positioned above said pulley; a cable slitting knife removably supported by said knife holder and having a cutting portion extending toward said pulley for cutting engagement with a cable in the groove of said pulley; a bracket secured to said frame members; adjusting screw means having screw threaded connection with said bracket; and spring means adjustably supported by said screw means and yieldingly urging said knife holder toward said pulley.

7. In a machine for longitudinally slitting a cable to facilitate salvaging the same, an upright frame comprising two spaced apart side members; a pulley rotatively mounted between said two spaced apart side members; a V shaped groove extending around the peripheral portion of said pulley adapted to receive a cable to be slitted; teeth in the walls that form the sides of said V shaped groove to engage with and grip a cable; said teeth being inclined relative to lines radial to said pulley to give the peripheral portions of said teeth a lead in the direction of rotation of the pulley whereby said teeth will tend to draw a cable toward the center of said pulley; pulley driving means connected with said pulley; and a cable slitting knife having a cutting portion extending toward said pulley into the path of a cable disposed in the groove of said pulley.

8. In a machine for longitudinally slitting a cable, a frame, a pulley rotatively mounted on said frame; a V shaped groove extending around the peripheral portion of said pulley adapted to receive a cable that is to be slitted, a knife holder; pivot means supporting one end portion of said knife holder, the other end portion of said knife holder being movable toward and away from said pulley in the plane of the pulley, a cable slitting knife carried by the movable end portion of said knife holding member and having a cutting edge operable in the V shaped groove in said pulley; and a cable engaging member provided on said knife carrying member on each side of said knife.

9. In a machine for longitudinally slitting a cable, a frame, a pulley rotatively mounted on said frame; a V shaped groove extending around the peripheral portion of said pulley adapted to receive a cable that is to be slitted, a narrow groove in the bottom of said V shaped groove; a stripper member positioned in said V shaped groove, said stripper member having tooth means extending into said narrow groove; a knife holder; pivot means supporting one end portion of said knife holder, the other end portion of said knife holder being movable toward and away from said pulley in the plane of the pulley; and a cable slitting knife carried by the movable end portion of said knife holding member and having a cutting edge operable in the V shaped groove in said pulley.

WILLIAM C. POPE.